United States Patent [19]

Rippingale et al.

[11] Patent Number: 5,122,750
[45] Date of Patent: * Jun. 16, 1992

[54] METHODS EMPLOYING PERMANENT MAGNETS FOR MARKING, LOCATING, TRACING AND IDENTIFYING HIDDEN OBJECTS SUCH AS BURIED FIBER OPTIC CABLES

[75] Inventors: John B. Rippingale, Leesburg, Va.; Charles R. Upton, Silver Spring, Md.; Erick O. Schonstedt, Reston; Bradley L. Osman, Herndon, both of Va.

[73] Assignee: Schonstedt Instrument Company, Reston, Va.

[*] Notice: The portion of the term of this patent subsequent to May 21, 2008 has been disclaimed.

[21] Appl. No.: 664,809

[22] Filed: Mar. 5, 1991

Related U.S. Application Data

[60] Division of Ser. No. 524,976, May 18, 1990, Pat. No. 5,017,873, which is a division of Ser. No. 428,757, Oct. 30, 1989, Pat. No. 5,006,806, which is a continuation-in-part of Ser. No. 323,860, Mar. 15, 1989, abandoned.

[51] Int. Cl.⁵ .................. G01V 3/08; G01V 3/165
[52] U.S. Cl. .................. 324/326; 324/207.22; 324/345
[58] Field of Search .............. 324/67, 200, 207.11, 324/207.22, 207.26, 226, 260, 326–329, 345; 116/209, DIG. 14; 138/104, 133, 174, 177, 178; 180/167, 168; 174/37; 335/285, 303, 306; 340/905; 350/96.1, 96.23; 405/157, 160, 175, 176

[56] References Cited

U.S. PATENT DOCUMENTS

| | | | |
|---|---|---|---|
| Re. 30,393 | 9/1980 | Sherlock | 174/37 |
| 1,803,288 | 4/1931 | Adler, Jr. | 180/167 |
| 2,597,601 | 5/1952 | Sherman | 2/179 |
| 2,775,736 | 12/1956 | Pies et al. | 324/48 |
| 2,854,840 | 10/1958 | Anderson | 72/16 |
| 2,931,383 | 4/1960 | Handley | 137/369 |
| 3,111,735 | 11/1963 | Ellis | 24/201 |
| 3,191,106 | 6/1965 | Baermann | 317/201 |
| 3,229,030 | 1/1966 | Baermann | 174/117 |
| 3,254,859 | 6/1966 | Reisch | 242/68.5 |
| 3,493,923 | 2/1970 | Stevens et al. | 340/905 |
| 3,504,503 | 4/1970 | Allen | 61/72.1 |

(List continued on next page.)

FOREIGN PATENT DOCUMENTS

| | | | |
|---|---|---|---|
| 1052559 | 3/1959 | Fed. Rep. of Germany . | |
| 1943914 | 3/1971 | Fed. Rep. of Germany . | |
| 2609556 | 7/1988 | France | 324/345 |
| 52-8852 | 1/1977 | Japan . | |
| 56-46480 | 4/1981 | Japan . | |
| 56-153271 | 11/1981 | Japan . | |
| 60-82881 | 5/1985 | Japan . | |
| 64-54280 | 3/1989 | Japan | 324/326 |
| WO88/04436 | 6/1988 | PCT Int'l Appl. . | |
| 574808 | 1/1946 | United Kingdom . | |

OTHER PUBLICATIONS

Berntsen, Inc. Brochure, "There's More Than One Way to Economically Reference Any Survey Monument Permanently", Jun. 1982.

Engineers Digest, M. Rouques, "Flexible Magnetic Material", Feb. 1966, pp. 101–103, vol. 27, No. 2.

B.F. Goodrich, "Koroseal Flexible Magnetic Sheet & Strip from B.F. Goodrich", 8 Page Brochure, Nov. 1986.

Bozworth, *Ferromagnetism*, "Measurement of Magnetic Quantities", published Mar. 1951, pp. 838–839.

Primary Examiner—Gerard R. Strecker
Attorney, Agent, or Firm—Shapiro and Shapiro

[57] ABSTRACT

In order to locate, trace, and identify hidden elongated objects, such as buried fiber optic cables, the objects are provided with elongated permanent magnet identifier devices having magnetic fields that may be detected at a distance from the objects. In one embodiment the identifier device comprises an elongated strip magnetized in the direction of its width and formed into a long-pitch helix, producing a characteristic "magnetic field signature" that enhances detection and identification of the object, as by a portable gradiometer that is moved over the surface of the earth along a line generally parallel to the length of the object. This embodiment may provide a magnetic field that diminishes as the square of the distance from the identifier device (rather than the usual cube of the distance), thereby enabling detection at substantial distances. In a second embodiment distinctive magnetic field signatures are produced by arrays of spaced permanent magnets, the fields of which add and subtract to provide resultant magnetic fields with peaks and valleys along a line generally parallel to the length of the object.

21 Claims, 19 Drawing Sheets

U.S PATENT DOCUMENTS

| Patent No. | Date | Inventor | Class |
|---|---|---|---|
| 3,513,912 | 5/1970 | Boop | 166/65 |
| 3,568,626 | 3/1971 | Southworth, Jr. | 116/114 |
| 3,575,255 | 4/1971 | Wickstrom | 340/905 X |
| 3,633,533 | 1/1972 | Allen et al. | 116/114 |
| 3,714,625 | 1/1973 | Fayling | 180/167 X |
| 3,746,034 | 7/1973 | Cosson | 137/364 |
| 3,753,223 | 8/1973 | Fayling | 340/905 |
| 3,764,223 | 10/1973 | Lucero et al. | 404/79 |
| 3,908,582 | 9/1975 | Evett | 116/114 R |
| 3,942,147 | 3/1976 | Josephson | 335/285 |
| 4,021,725 | 5/1977 | Kirkland | 324/3 |
| 4,055,796 | 10/1977 | Nelson | 324/3 |
| 4,107,601 | 8/1978 | Barmeier, Jr. et al. | 324/173 |
| 4,119,908 | 10/1978 | Cosman et al. | 324/3 |
| 4,427,943 | 1/1984 | Cloutier et al. | 324/326 |
| 4,430,613 | 2/1984 | French | 324/200 |
| 4,449,098 | 5/1984 | Nakamura et al. | 324/326 |
| 4,527,123 | 7/1985 | Gilman et al. | 324/254 |
| 4,549,039 | 10/1985 | Charlebois et al. | 174/72 R |
| 4,573,016 | 2/1986 | Nakamura et al. | 324/326 |
| 4,623,282 | 11/1986 | Allen | 405/157 |
| 4,641,091 | 2/1987 | Cone | 324/202 |
| 4,699,838 | 10/1987 | Gilbert | 428/201 |
| 4,767,237 | 8/1988 | Cosman et al. | 405/157 |
| 4,781,958 | 11/1988 | Gilbert | 428/76 |
| 5,017,873 | 5/1991 | Rippingale et al. | 324/345 X |
| 5,036,210 | 7/1991 | Goodman | 235/493 |
| 5,051,034 | 9/1991 | Goodman | 405/157 |

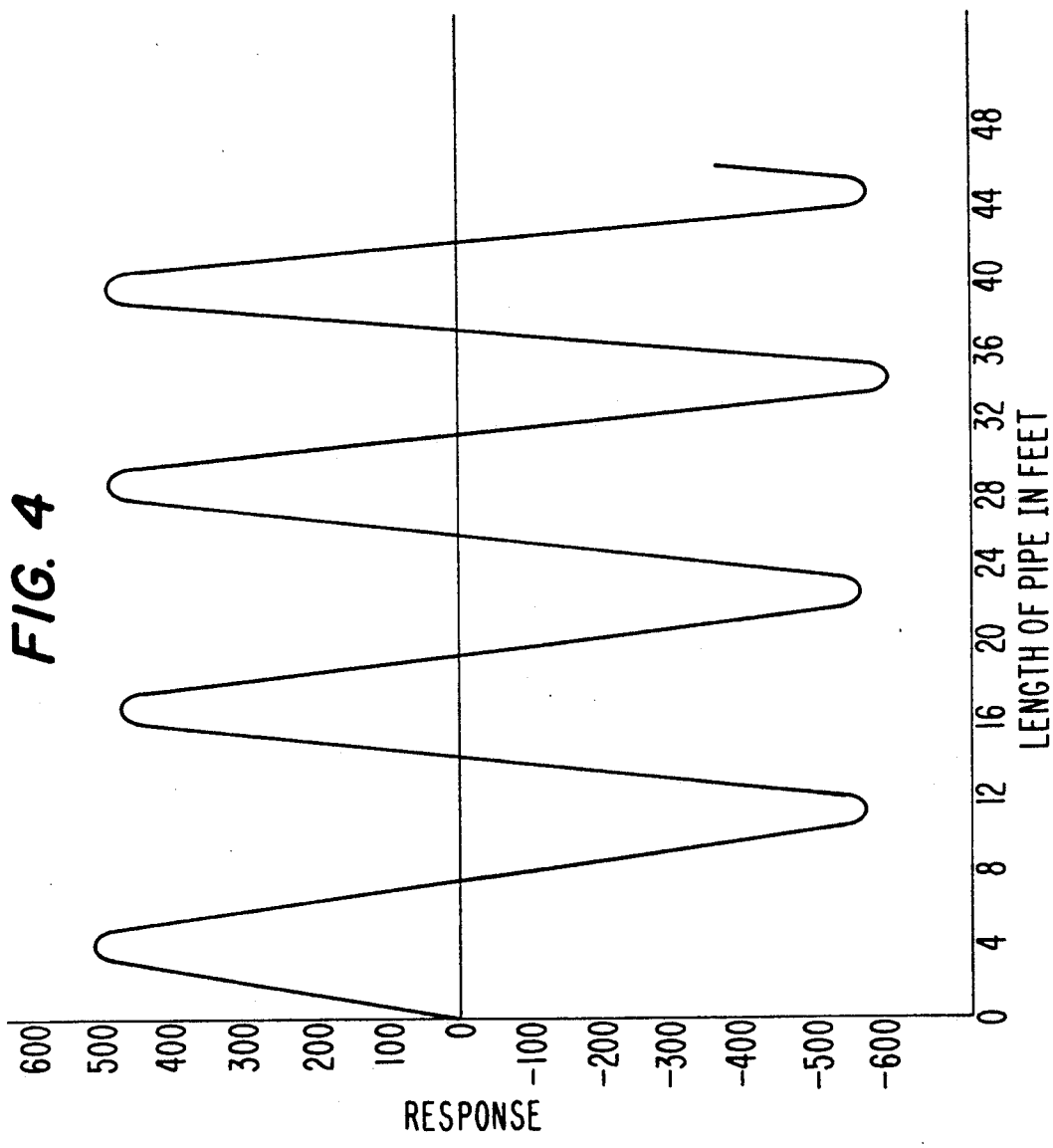

METHODS EMPLOYING PERMANENT MAGNETS FOR MARKING, LOCATING, TRACING AND IDENTIFYING HIDDEN OBJECTS SUCH AS BURIED FIBER OPTIC CABLES

REFERENCE TO RELATED APPLICATION

This is a division of application Ser. No. 524,976 filed May 18, 1990 (now U.S. Pat. No. 5,017,873 issued May 21, 1991), which is a division of application Ser. No. 428,757 filed Oct. 30, 1989 (now U.S. Pat. No. 5,006,806 issued Apr. 9, 1991), which is a continuation-in-part of application Ser. No. 323,860 filed Mar. 15, 1989 (abandoned).

BACKGROUND OF THE INVENTION

This invention relates to methods and apparatus in which permanent magnets are employed to mark hidden objects so that the objects may be located, traced, and identified. The invention has particular application to buried fiber optic cables and to other buried non-conductive objects, such as ducts, conduits, or pipes used by utilities. The invention will be described, for purposes of illustration only, as applied to ducts for fiber optic cables.

Many of the fiber optic cables currently being placed in the ground are totally non-conductive. Even the strength member is non-metallic. Conductors that might be used for tracing a buried cable are omitted to prevent lightning from following the conductors and damaging the cable. The absence of conductors creates problems when it becomes necessary to locate a buried cable, because cable tracers require a conductor that carries a tracing signal.

It has previously been proposed to associate permanent magnets with a fiber optic cable, as by providing the magnets on a tracer tape buried separately along with the cable, in order to assist in locating and tracing the cable. However, this approach has several disadvantages, including the possibility that the tracer tape will be installed improperly and thus not detected, the limited distance at which the tape can be detected, and the inability reliably to distinguish the weak magnetic field of the magnets from magnetic fields associated with ferrous pipes, for example, that may be buried in the same area.

BRIEF DESCRIPTION OF THE INVENTION

The present invention provides new methods and apparatus for marking, locating, tracing, and identifying hidden objects, such as buried, non-conductive cables (e.g., fiber optic cables) and non-conductive pipes, tubes, ducts and conduits.

In accordance with one of the broader aspects of the invention, an elongated permanent magnet device is provided on an elongated hidden object to be detected, with the length of the device extending along the length of the object. The device has a magnetic axis transverse to the length of the object and has a magnetic field that varies in a predetermined manner along the length of the object. The hidden object is detected by detecting the magnetic field, the strength of which may diminish substantially as the square of the distance from the device along a direction transverse to the length of the object. The elongated permanent magnet device may comprise a strip having a width dimension substantially greater than its thickness dimension, the strip being magnetized in the direction of its width. The strip may be formed into a helix. With such a device, the orientation of the magnetic axis varies at different positions along the length of the object to provide a magnetic field signature for identifying the object.

In accordance with another of the broader aspects of the invention, a hidden elongated object may be located, traced, and identified by providing on the object an elongated permanent magnet device having its length extending along the length of the object, the device producing a magnetic field having a predetermined magnetic field signature including a series of peaks and valleys at points along a line substantially parallel to the length of the object; and moving a magnetic field detector along the line and producing an output from the detector corresponding to the peaks and valleys. The permanent magnet device may comprise a series of permanent magnets extending along the length of the object, the magnets being constructed and disposed so that magnetic fields of successive magnets add or subtract to produce the magnetic field signature. By employing arrays of magnets with different polarity permutations, different magnetic field signatures may be provided for the identification of corresponding objects. By employing successive magnets having magnetic fields that are additive, the magnitude of peaks and/or valleys of the magnetic field signature can be made substantially greater than would be produced by individual magnets, thereby improving detectability of the object.

BRIEF DESCRIPTION OF THE DRAWINGS

The invention will be further described in conjunction with the accompanying drawings, which illustrate preferred (best mode) embodiments of the invention, and wherein:

FIGS. 3A and 3B are fragmentary diagrammatic perspective views, illustrating structural variations of the first embodiment, while

FIG. 4 is a diagram illustrating a magnetic field signature produced in accordance with the first embodiment of the invention;

DETAILED DESCRIPTION OF PREFERRED EMBODIMENTS

Figure 1:
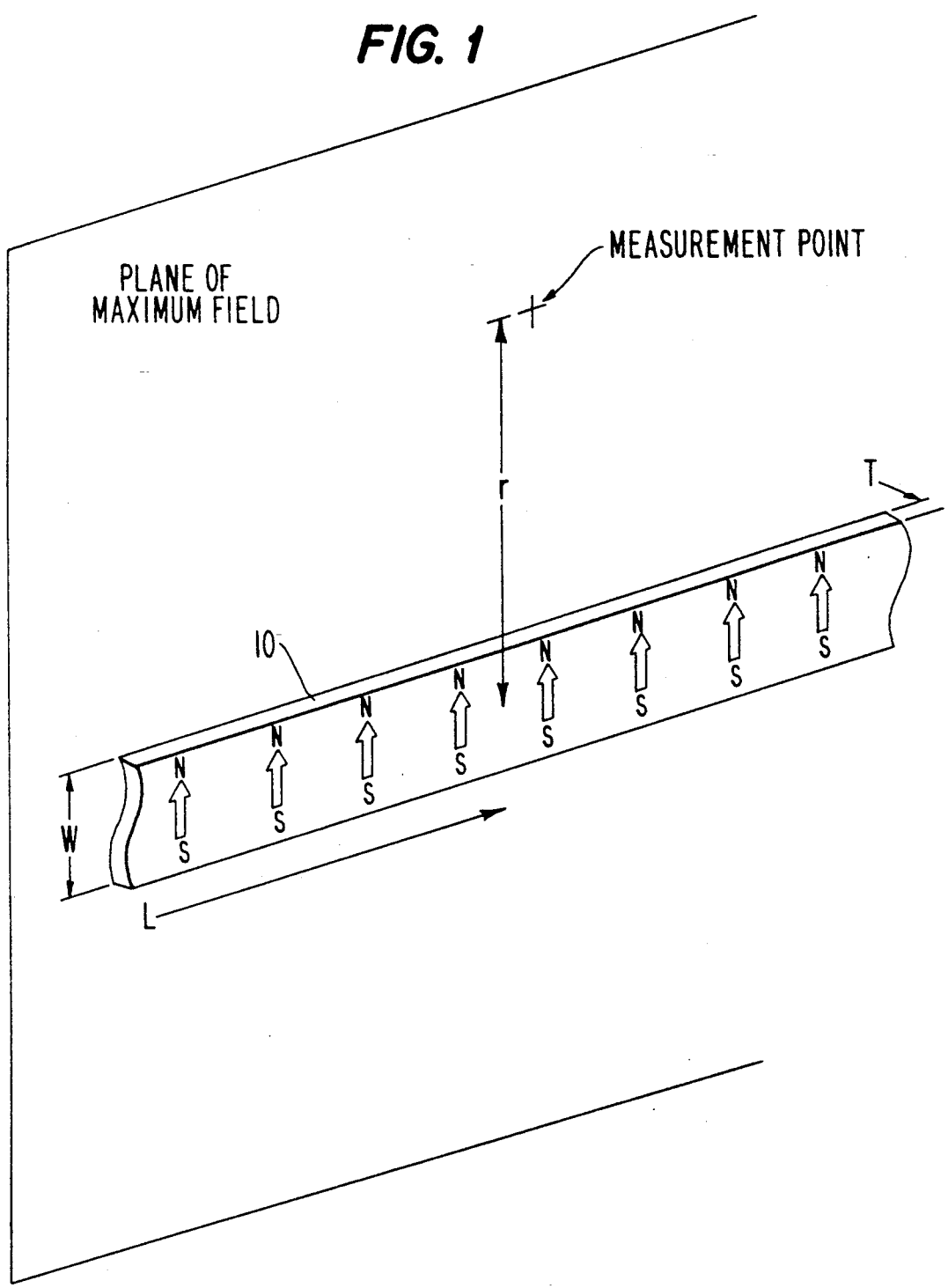
FIG. 1 is a diagrammatic perspective view illustrating an underlying principle of a first embodiment of the invention.

Before the invention is described in detail, certain aspects of permanent magnets will be considered.

An ordinary bar magnet has a magnetic field that is a maximum near its poles. If the magnet is oriented with its longitudinal axis (magnetic axis) vertical, for example, a magnetic field vector measuring device will produce a response if the sensory axis of the device is oriented vertically over the magnet. If the magnet is then turned 90°, so that its longitudinal axis is horizontal, the response will drop substantially to zero as the magnetic vector becomes perpendicular to the sensory axis of the measuring device. If the magnet is turned 90 again, so that it is inverted from its initial position, the measuring device will produce a response of opposite polarity from the initial response. Turning the magnet further by 90° produces a zero response again. Finally, turning the magnet 90° again places the magnet in its initial position and produces the initial response of the measuring device.

It is known that for a given pole strength, the longer the magnet, the stronger the field that will be detected by the measuring device, and as noted earlier, it is known that the maximum field lies off of the end of the magnet. However, except as explained hereinafter, the detected magnetic field strength of a bar magnet is a function of the inverse cube of the distance from the magnet, that is, it diminishes with the cube of the distance from the magnet, so that doubling the distance causes an eight-fold loss of field. See *Ferromagnetism* by Bozorth, Van Nostrand Company, Chapter 19, p. 838. Therefore, even if the sensory axis of the measuring device is aligned with the length of the magnet, and even if the length of the magnet is made as long as possible within practical constraints, the distance at which the magnet can be reliably detected by a practical magnetic field measuring device is quite limited.

In accordance with one aspect of a first embodiment of the present invention, a hidden object to be detected has associated therewith a permanent magnet identifier device having a magnetic field that diminishes as the square of the distance from the device, rather than as the cube of the distance, as is usually the case. To maximize the detection range, the identifier device may be constructed and disposed so as to provide a substantial vertical component of magnetic field for detection by a magnetic field detector that produces a strong response to that component. The identifier device is preferably an elongated strip that is magnetized in the direction of its width (perpendicular to its thickness) to provide a magnetic axis in the direction of the width. By virtue of this construction, if the width of the strip is maintained vertical, the detected magnetic field is essentially the sum of the magnetic fields of an infinite series of bar magnets. The relationship between the magnetic field and the distance from the strip is then governed by an inverse square law, so that doubling of the distance causes a four-times loss of field, rather than an eight-times loss as in the case of a discrete bar magnet.

There are a few instances in the prior art in which the relationship between the magnetic field of a permanent magnet and the distance from the magnet is governed by an inverse square law. For example, if the magnetic field is measured in the vicinity of one pole of a very long bar magnet at a position so far from the opposite pole that the contribution from the opposite pole is negligible, then an inverse square law applies. However, such instances have little relevance to the use of permanent magnets in locating, tracing, and identifying buried elongated objects such as ducts or pipes that extend generally horizontally. Prior art techniques for magnetically marking such objects so that they may be located and traced have not been able to provide the advantages of the present invention, including, in the first embodiment, a relationship between the magnetic field and the distance from a permanent magnet identifier device that is governed by an inverse square law.

While in some cases it may be possible to maintain vertical orientation of the magnetic axis of the identifier device of the invention, in many cases this is not possible as a practical matter. For example, if a straight strip magnetized width-wise is attached to a duct so that it extends lengthwise along the length of the duct at one side thereof, it is difficult to ensure that the width of the strip will be vertical when the duct is buried. However, as will be explained hereinafter, if there is a sufficient length of the strip that remains essentially vertical, detection of the strip will follow the inverse square law, as desired.

In accordance with an important aspect of the first embodiment of the invention, it is not necessary to maintain a vertical orientation of the width of the strip throughout its length. To the contrary, the strip is preferably formed into an elongated helix having a longitudinal pitch (axial length of each turn) that is substantially greater than the cross dimensions of the helix, so that the width of the strip along a substantial portion of the length of each turn of the helix will be oriented essentially vertically. The helical configuration has an important additional advantage in that a distinctive "magnetic field signature" is produced that will be detected by a magnetic field detector to confirm the identification of the magnetic strip. In practice, a pitch of about twelve feet has been found quite satisfactory where the inverse square law effect is desired.

Referring now to the drawings, FIG. 1 illustrates a portion of a magnetic strip 10 with its length L extending horizontally and its width W extending vertically. The width dimension of the strip is much greater than the thickness T of the strip, and the strip is permanently magnetized along its width W, so as to provide a magnetic axis in the direction of the width and so as to maximize the vertical magnetic field component detected at a measurement point at a distance "r" from the longitudinal center line of the strip. In FIG. 1 the measurement point is shown in the plane of maximum field. As is apparent, the magnetic field seen at the measurement point is, in effect, the sum of the magnetic fields of an infinitely long series of permanent magnets with their magnetic axes oriented vertically (in the direction of the width W of strip 10).

The strip may be a magnetic tape ½ wide and 1/16 in. thick, for example, and may be formed of a mixture of rubber or plastic and a ferrite such as barium ferrite, for example. Such strips, comprising 80% by weight or 65% by volume of magnetic powder (such as barium ferrite and perhaps some strontium) and the balance rubber, are used in the magnetic gaskets of refrigerator doors, but, in general, they are not magnetized in the direction of the width of the strip as shown in FIG. 1.

Figure 2:
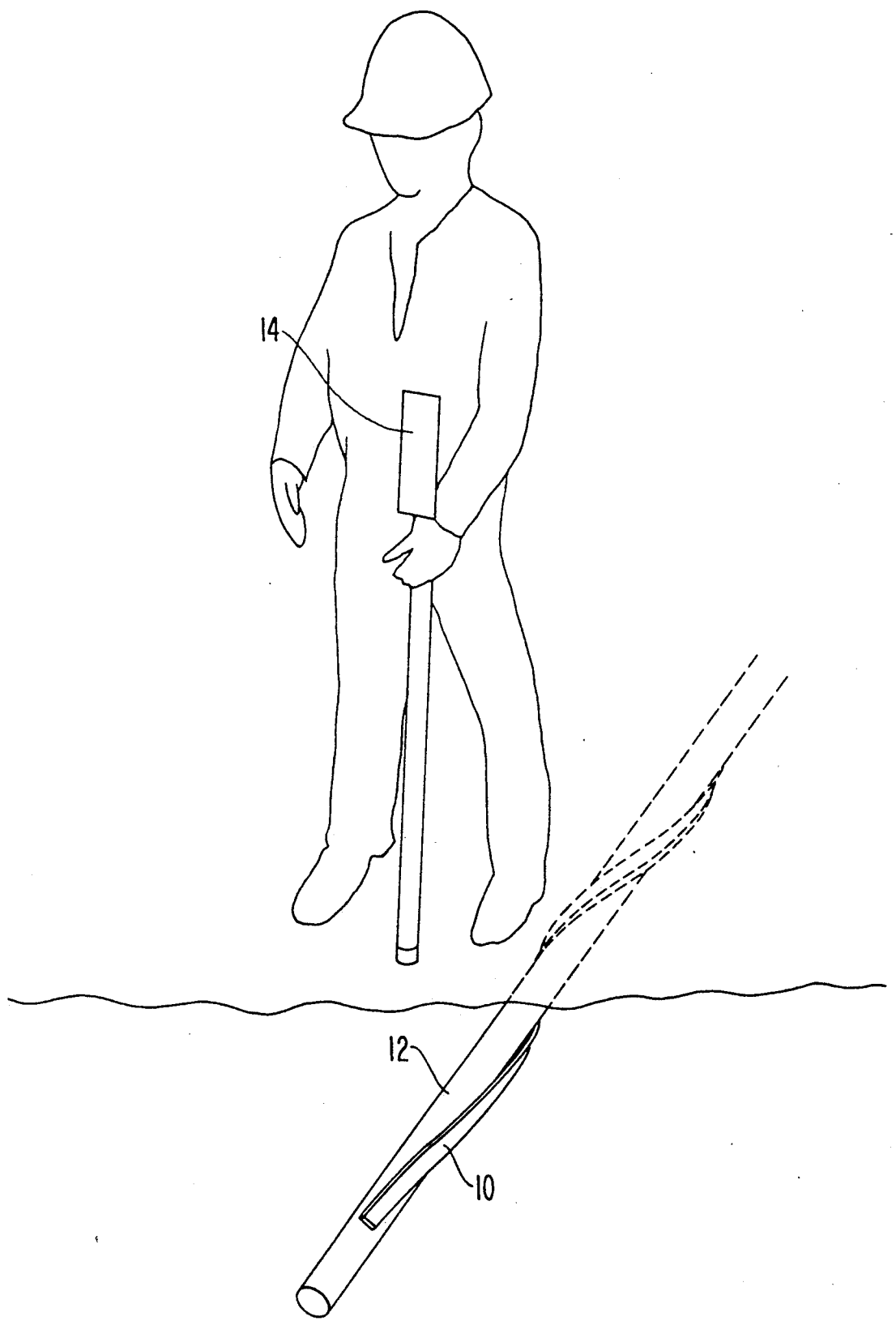
FIG. 2 is a diagrammatic perspective view illustrating one application of the invention, namely locating and tracing a fiber optic cable.

As shown in FIG. 2, the strip 10 of FIG. 1 is supported on an elongated, non-conductive object 12, such as a fiber optic cable, tube, pipe, or duct, for example. In the form illustrated, the strip is wound about the object 12 to form a long-pitch helix (12-foot pitch, for example) so that the axis of the helix extends along the length of the object 12. The strip may be wound about a fiber optic cable, for example, or about a conduit or duct in which the cable is contained. The strip may be adhered to the object by tape or adhesive, for example.

Figure 3A:
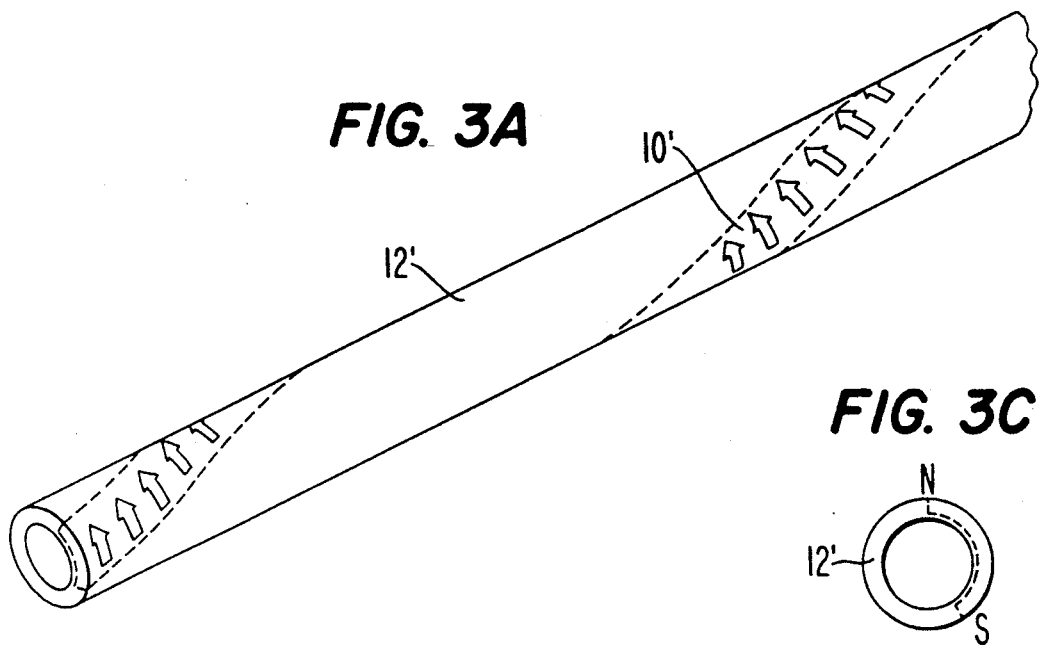
Figure 3C:
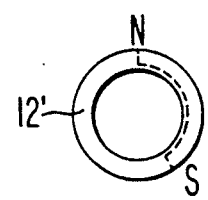
FIGS. 3C and 3D are corresponding end views, respectively.
Figure 3B:
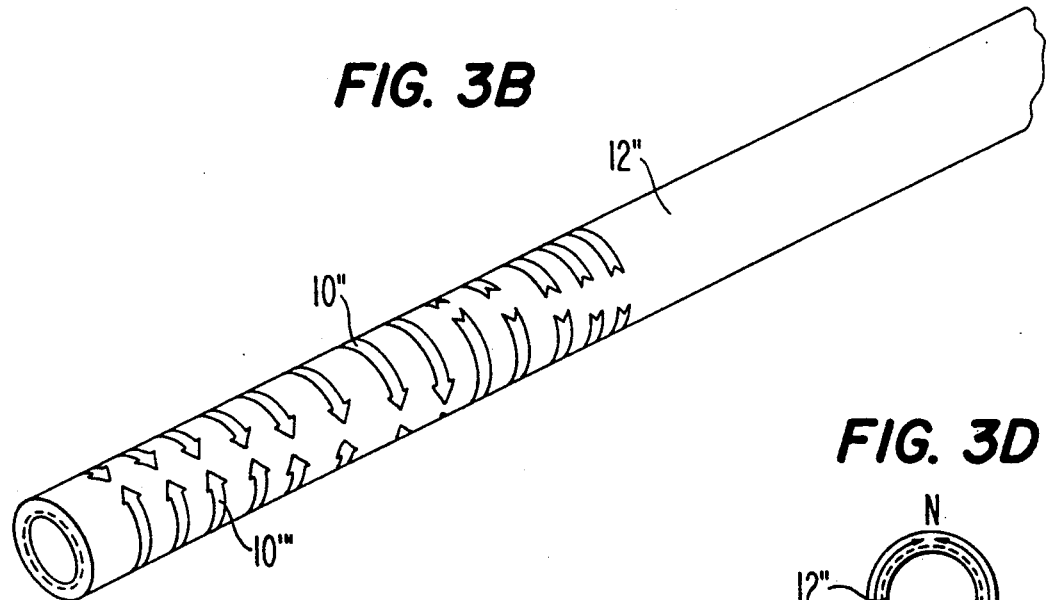
Figure 3D:
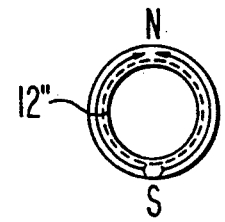

Instead of providing a separate strip that is attached to an object, a magnetic strip may be painted on or coated on the object, or may be extruded into or molded into the outer surface of the object (or the inner surface if the object is hollow). If the object is formed of plastic, a ferrite may be mixed directly into a plastic resin or binder before extrusion or molding of an object. If the ferrite is dispersed throughout the object, it may still be magnetized so as to form a helical strip with a magnetic axis in the direction of its width. The term "strip" is therefore intended to include what might be termed a "stripe." FIGS. 3A and 3C illustrate a structural variation including such a stripe 10' that is integral with an elongated object 12'. FIGS. 3B and 3D illustrate a further variation including a pair of such stripes 10", 10''' integral with an elongated object 12". In this variation the orientation of the magnetic axis N-S "rotates" in successive transverse planes along the length of the object, simulating a diametral strip that is twisted about its longitudinal axis. This variation is also illustrative of the fact that the identifier device may include more than one strip or stripe. In all variations of the first embodiment the magnetic axis of the identifier device is transverse to the length of the object.

To detect a buried object associated with a magnetic identifier device in accordance with the invention, a magnetic field measuring device or gradiometer 14 may be employed as shown in FIG. 2. All such devices are embraced within the term "magnetic field detector" as used herein. The model GA-52B magnetic locator of the assignee of the invention, having a detection threshold of about 10 gammas, has been employed quite successfully for this purpose. Maximum detection distance is about 6 feet for the strip of FIG. 2 (12-foot pitch). The maximum detection distance varies with the pitch of the helix, so that a pitch of 20 or 30 feet (or more) may be used to permit detection at greater distances when appropriate.

A unique magnetic field signature produced in accordance with the first embodiment of the invention is shown in FIG. 4 and comprises a series of positive and negative excursions (peaks and valleys). The magnetic field signature shown is a response curve of a vertical gradiometer, in which the ordinate represents the gradient field in gammas and the abscissa represents the distance in feet as the gradiometer is moved over the ground along the length of a plastic pipe buried thirty inches and provided with a permanent magnet identifier device as shown in FIG. 2. This signature is produced by the helical winding of the strip (which causes the orientation of the magnetic field to vary), and is quite useful in confirming the identification of the buried object and in distinguishing the object from other objects, such as ferrous gas and water pipes, that produce random positive and negative excursions. Initial detection of an identifier device in accordance with the invention may be accomplished by a "sweep" of the area where the identifier device ought to be located, using the magnetic detector 14 in a conventional manner. When a response is noted at different points indicating the general direction of an identifier device, confirmation of the identification is achieved by moving the magnetic detector along the length of the identifier device and noting the magnetic field signature.

By virtue of the invention, non-conductive buried objects, such as fiber optic cables, are located, traced, and identified at substantial distances, easily and reliably. The invention is economical to implement and is therefore practical. Since the magnetic strip employed in the invention is non-conductive, lightning is no longer a problem. The strip is inert and stable and should last indefinitely in the ground. If the strip is cut, as by earth digging equipment, detectability of the strip is essentially unaffected, and the object associated with the strip can still be located. If the strip is integrated into or attached to the object during manufacture of the object, incorrect installation is no longer a problem. Also, use of the magnetic strip of the invention does not preclude the use of other locating means as well. The strip will not interfere with electronic markers, for example, or with a conventional wire or conductive tape placed above a cable in a trench.

Figure 5:
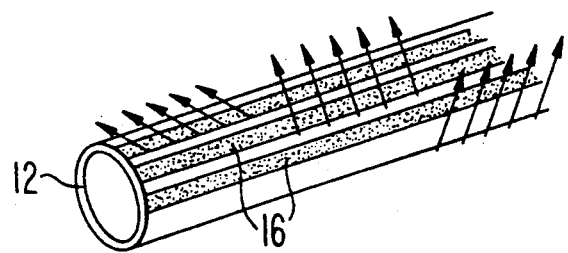
FIGS. 5-9 are fragmentary diagrammatic perspective views illustrating further structural variations of the first embodiment.
Figure 6:
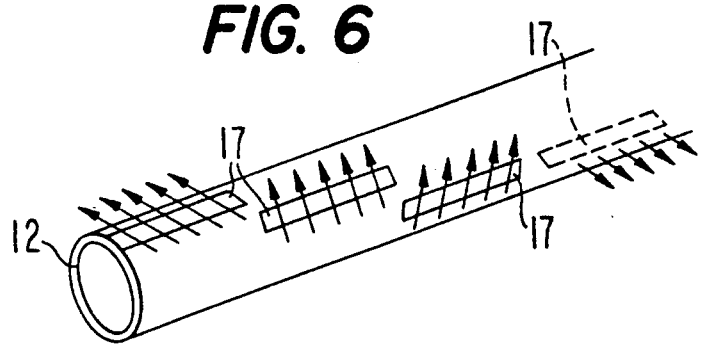

FIGS. 5–9 illustrate other structural variations of the first embodiment of the invention. In FIG. 5 an elongated hollow object 12 is provided with a plurality of straight magnetic strips 16 with their length parallel to the length of the object. The strips are spaced circumferentially of the object and may be provided on the outer surface or the inner surface of the object or within the material of the object. Each strip is magnetized to provide a magnetic axis in the direction of its width (transverse to the length of the object) at spaced locations along the length of the object. The pattern of magnetization is progressive, so that the orientation of the magnetic axis of the elongated magnetic identifier device constituted by the strips "rotates" from position to position along the length of the object. In the structure shown in FIG. 6 the strips, which in FIG. 5 extend along the entire length of the object, have been shortened to provide individual magnetized segments 17.

Figure 7:
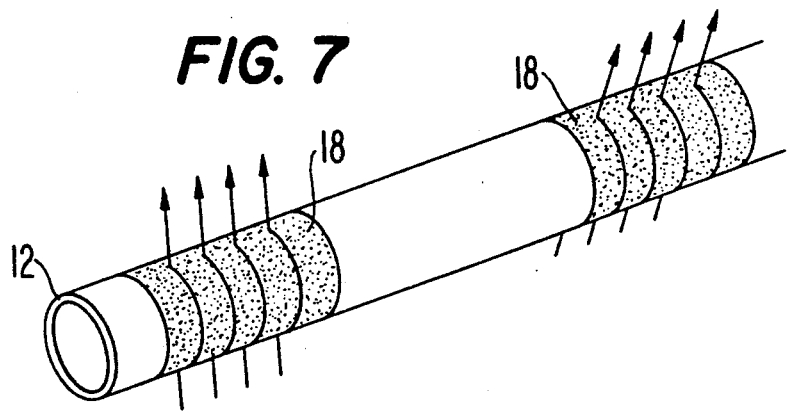

In FIG. 7 tubes 18 of magnetic material are provided at spaced locations along the length of the object. The tubes, which together constitute an elongated magnetic identifier device, are magnetized transversely of the length of the object, and the orientation of the magnetic axis shifts from tube to tube successively along the length of the object so as to "rotate."

Figure 8:
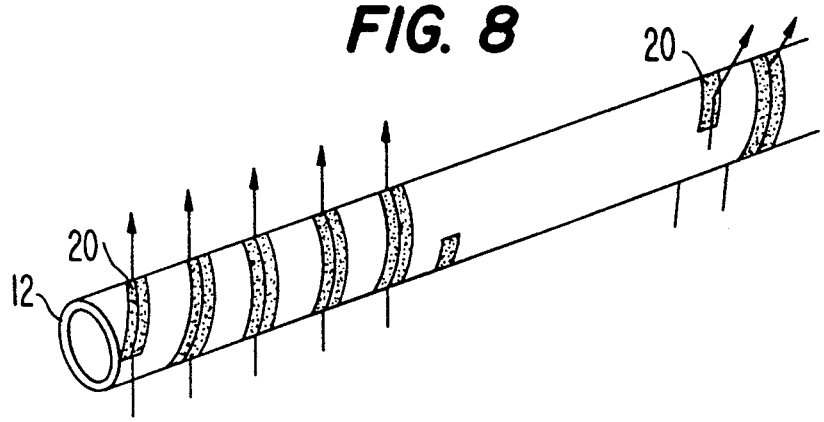

In FIG. 8 the tubes of FIG. 7 are replaced by short-pitch helical strips 20 magnetized like the tubes of FIG. 7. Together, the strips constitute an elongated magnetic identifier device. If the turns of the strips are close enough, essentially continuous tubes of the type shown in FIG. 7 are defined.

Figure 9:
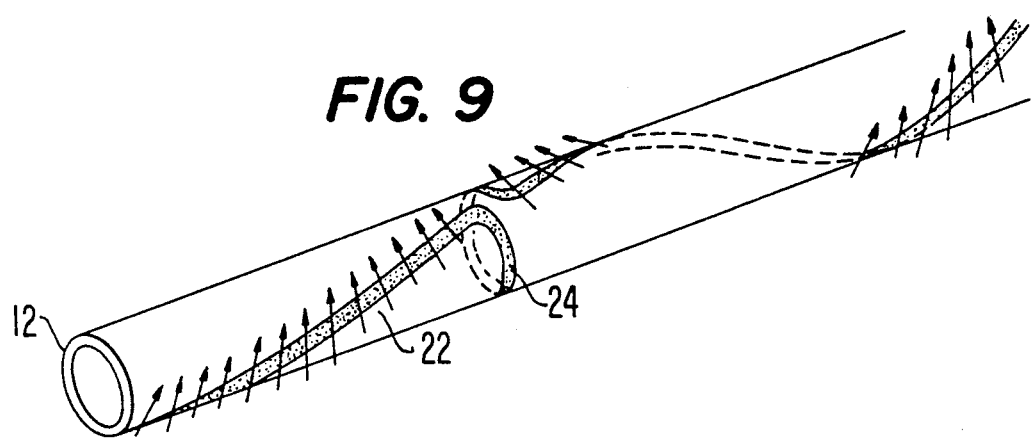

In FIG. 9 a helical strip 22 similar to that of FIG. 3A is employed, but the helical strip has a short retrace 24 at successive positions along the length of the object (only one retrace being illustrated).

In the first embodiment of the invention a magnetic field signature comprising successive peaks and valleys of the vertical magnetic field component (or the horizontal field component) is obtained by virtue of the fact that the orientation of the magnetic axis of the identifier device, which is transverse to the length of the object, varies along the length of the object. In a second embodiment of the invention, which will now be described, a magnetic field signature comprising peaks and valleys is obtained in another manner, although without the advantage of the inverse square law effect that may be obtained in the first embodiment. The second embodiment is especially useful, for example, where the distance between the hidden object and the magnetic field detector is not so great as to benefit significantly from the inverse square law effect.

Figure 10:
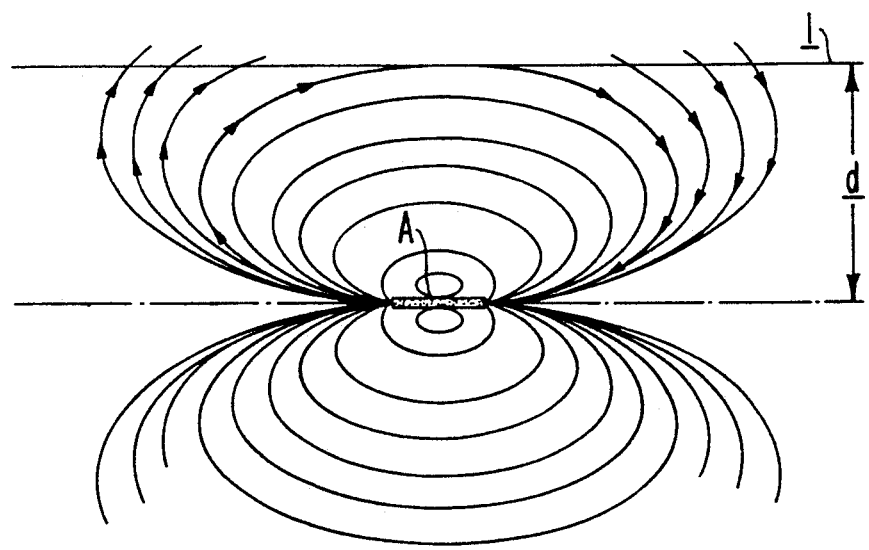
FIG. 10 is a diagrammatic elevational view illustrating the magnetic field of a bar magnet.
Figure 11:
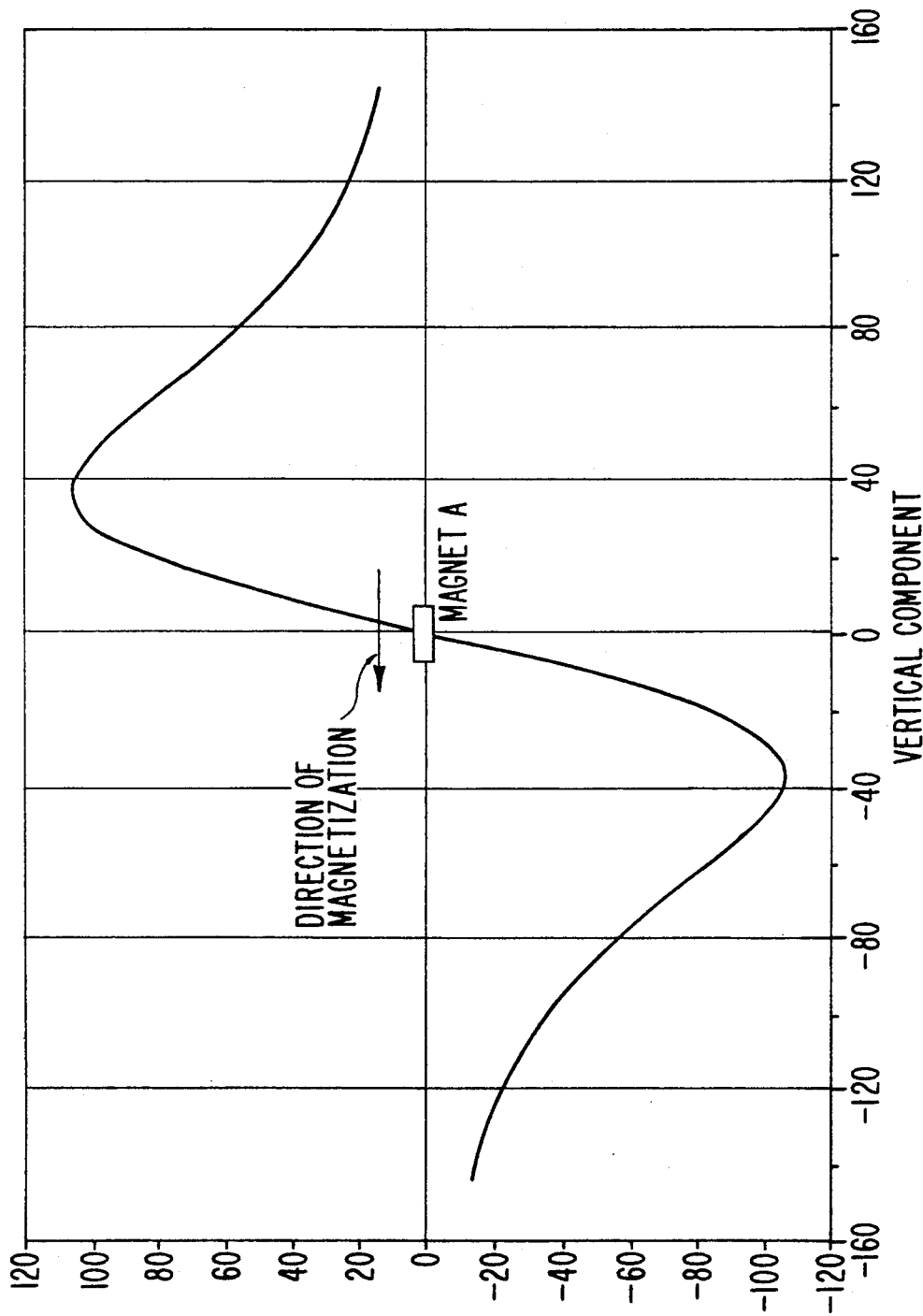
FIG. 11 is a diagram illustrating the vertical component of the magnetic field of the bar magnet of FIG. 10 at positions along a line parallel to the magnetic axis of the bar magnet.
Figure 12:
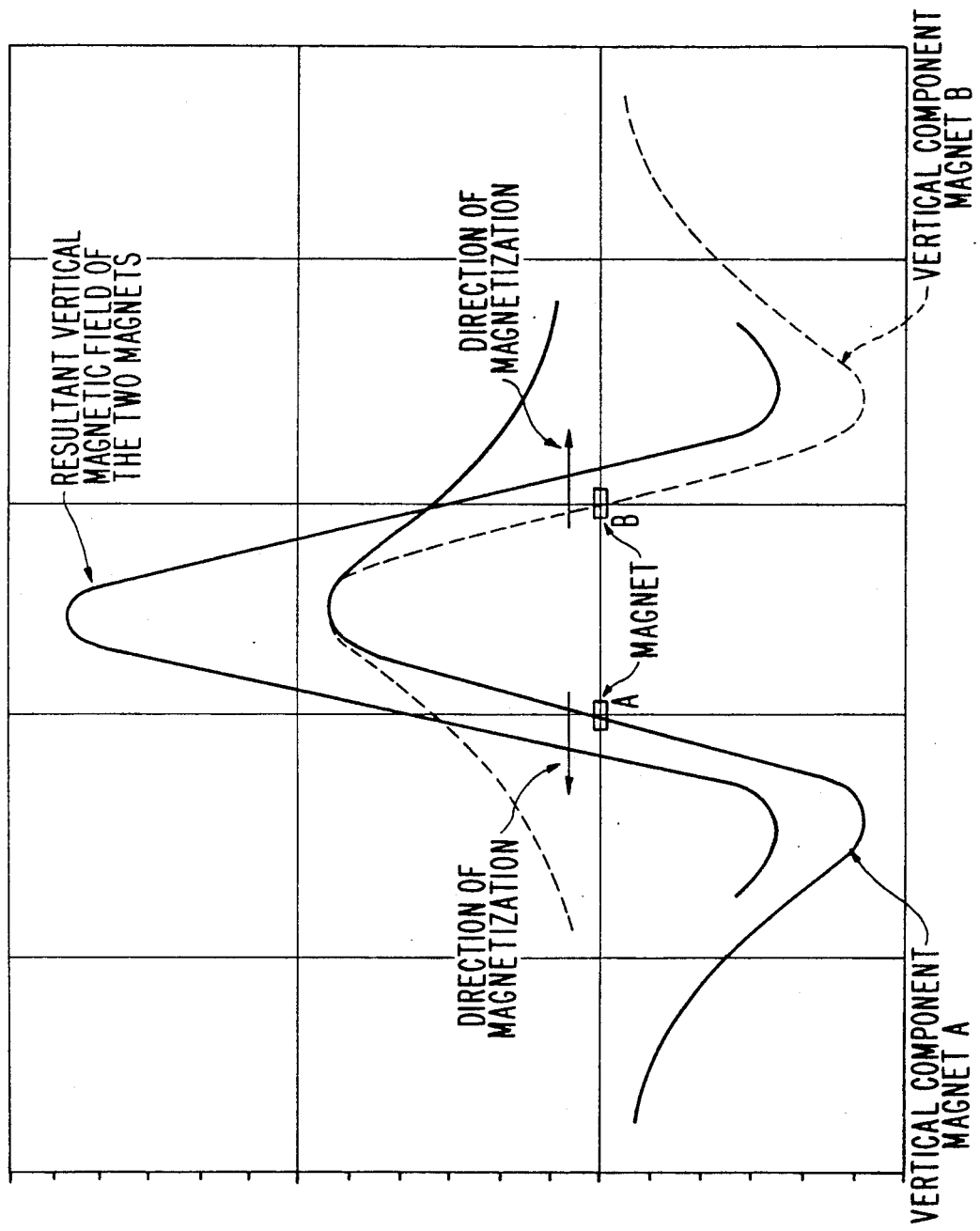
FIG. 12 is a diagram similar to FIG. 11, but illustrating the vertical component of the magnetic field resulting from two spaced bar magnets of opposite polarity with their axes collinear.
Figure 13:
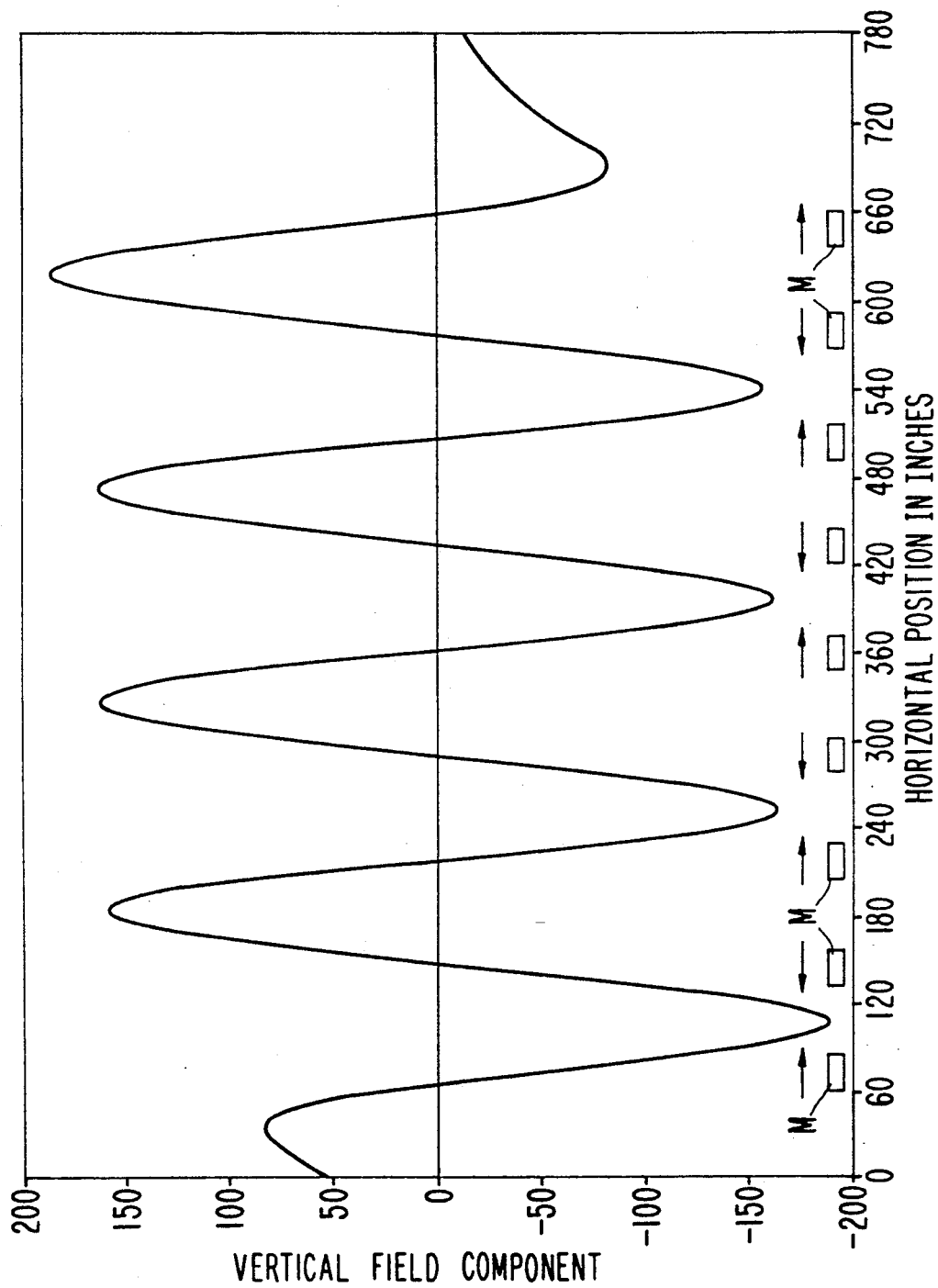
FIGS. 13-17 are diagrams similar to FIG. 12 for arrays of bar magnets with different polarity permutations.
Figure 14:
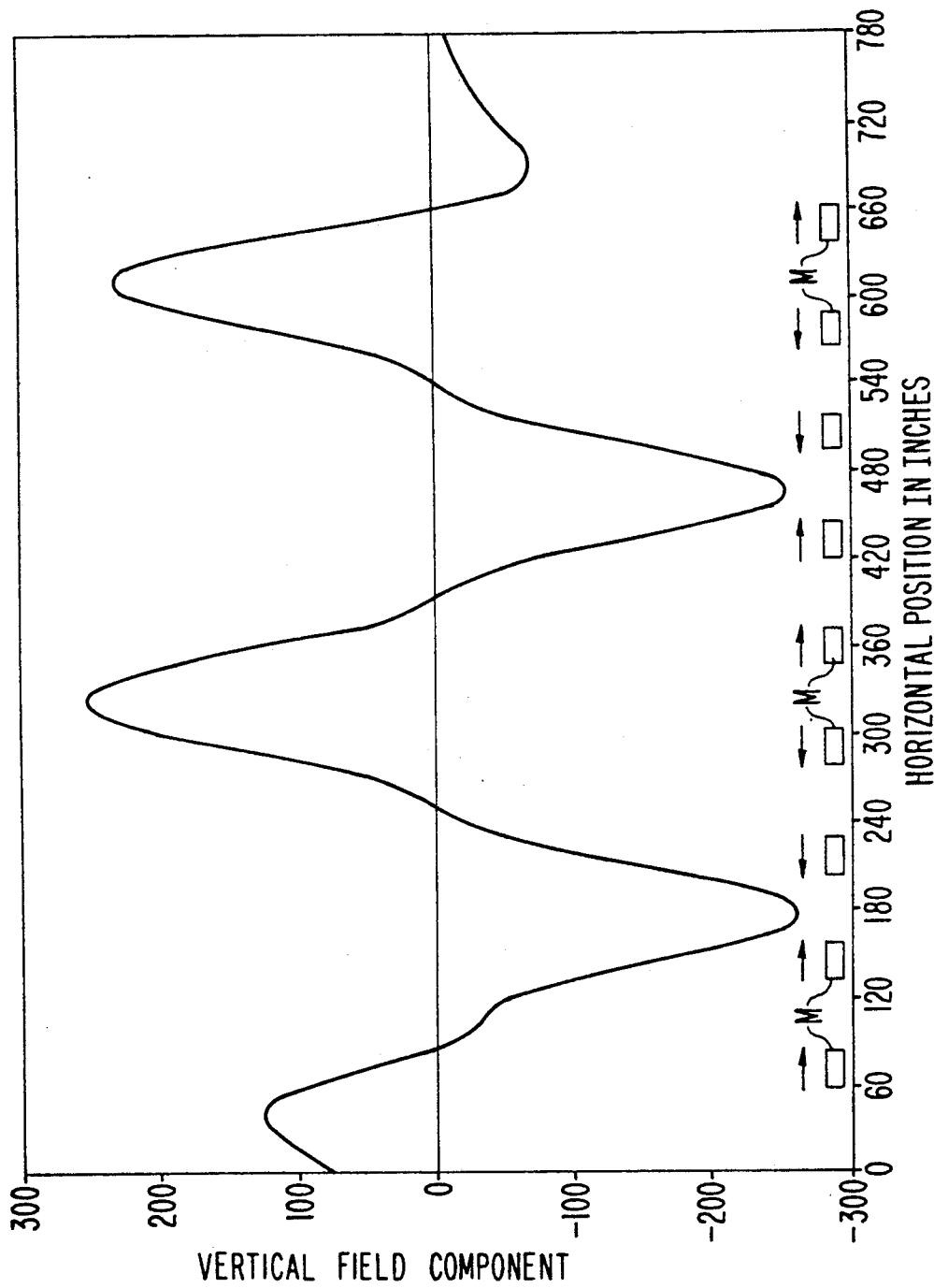
Figure 15:
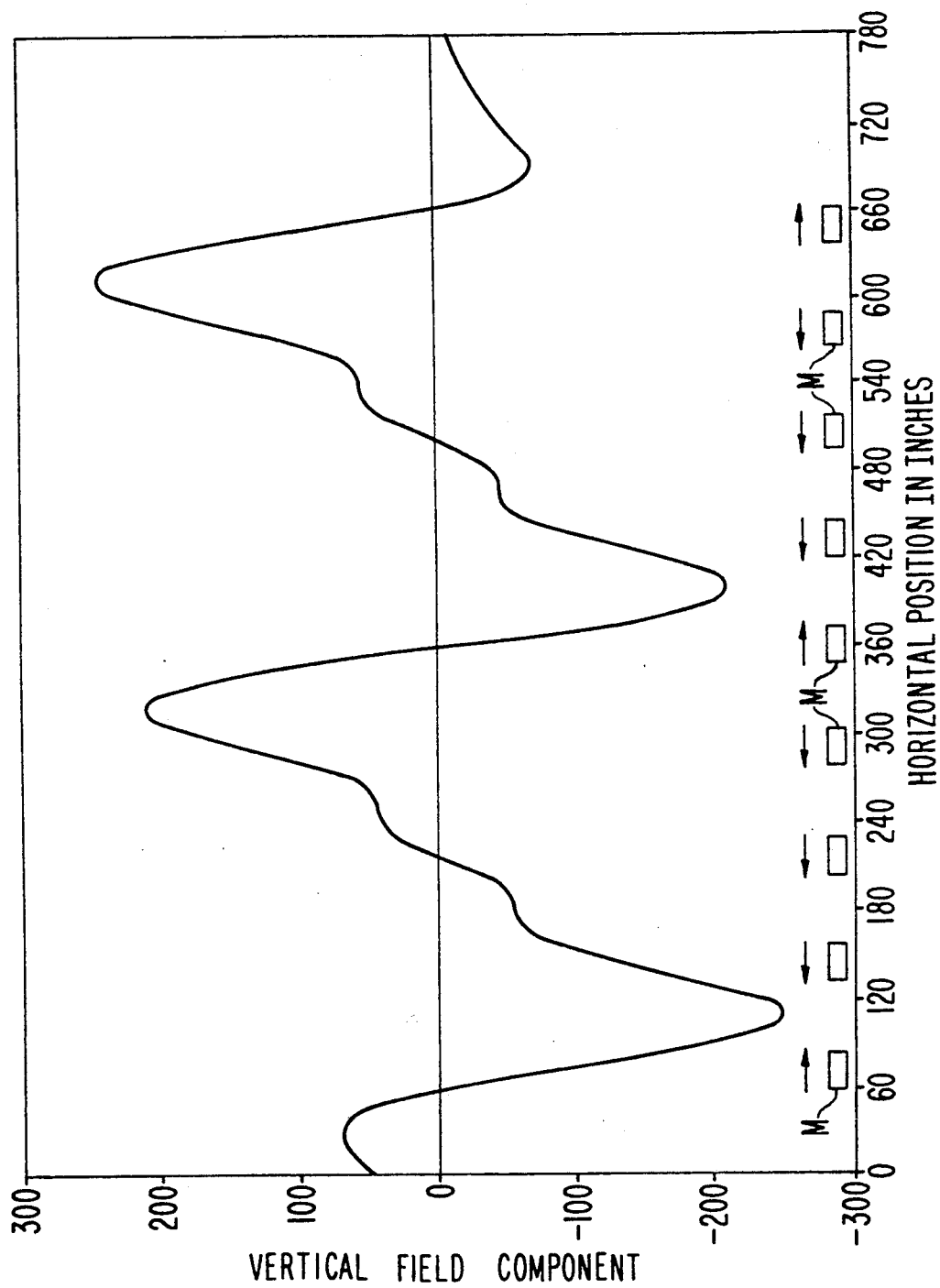
Figure 16:
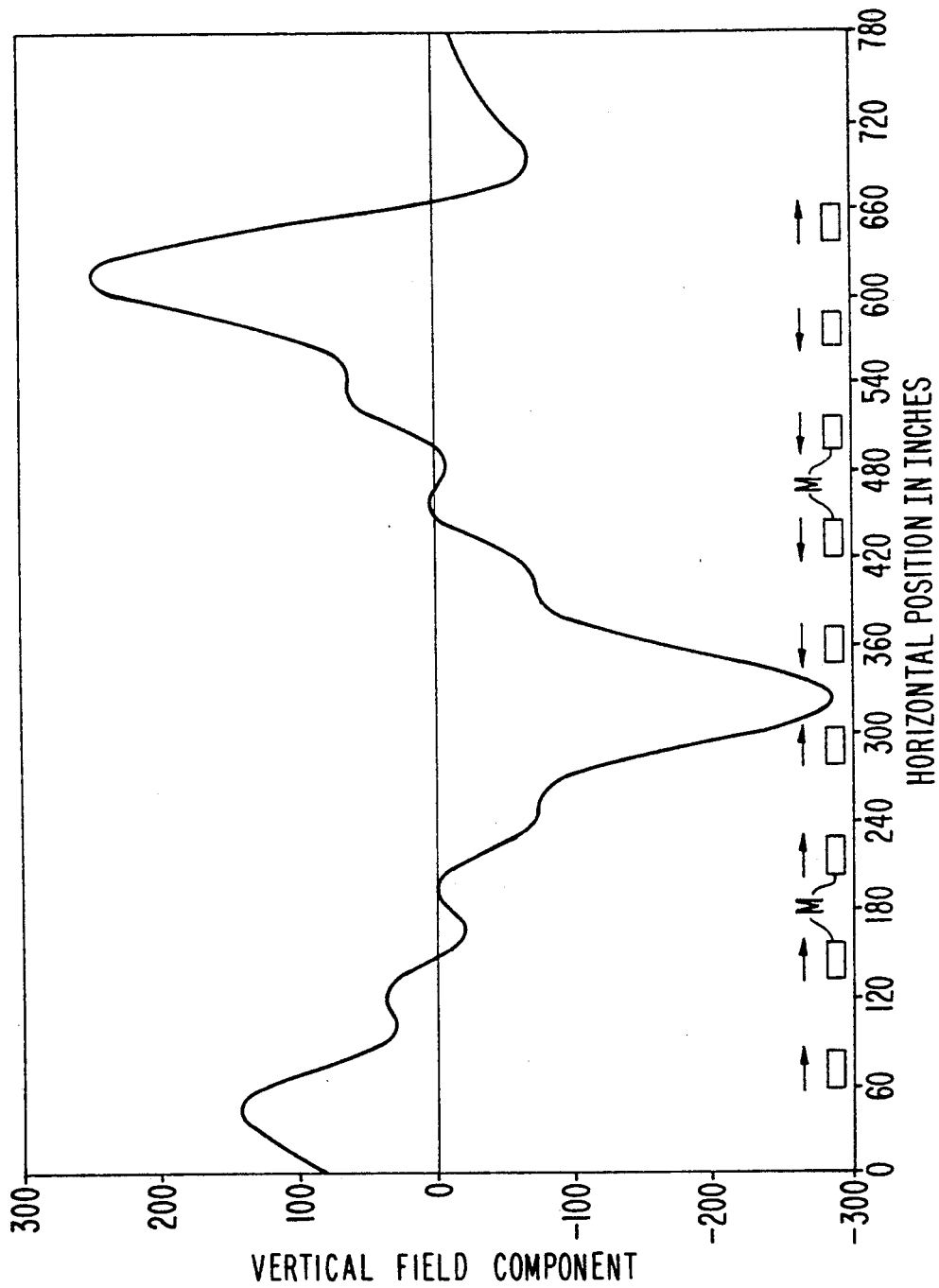
Figure 17:
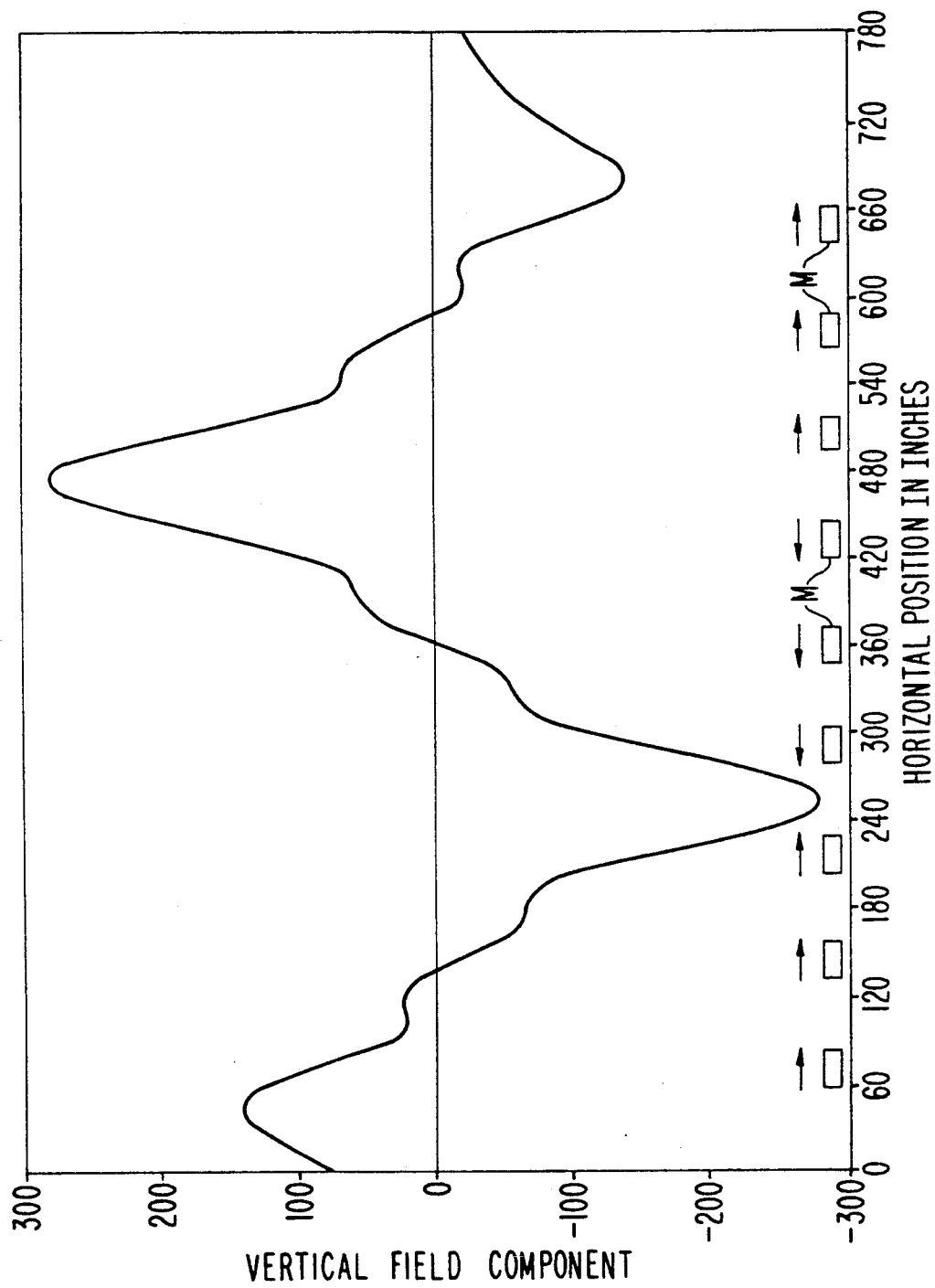
Figure 18:
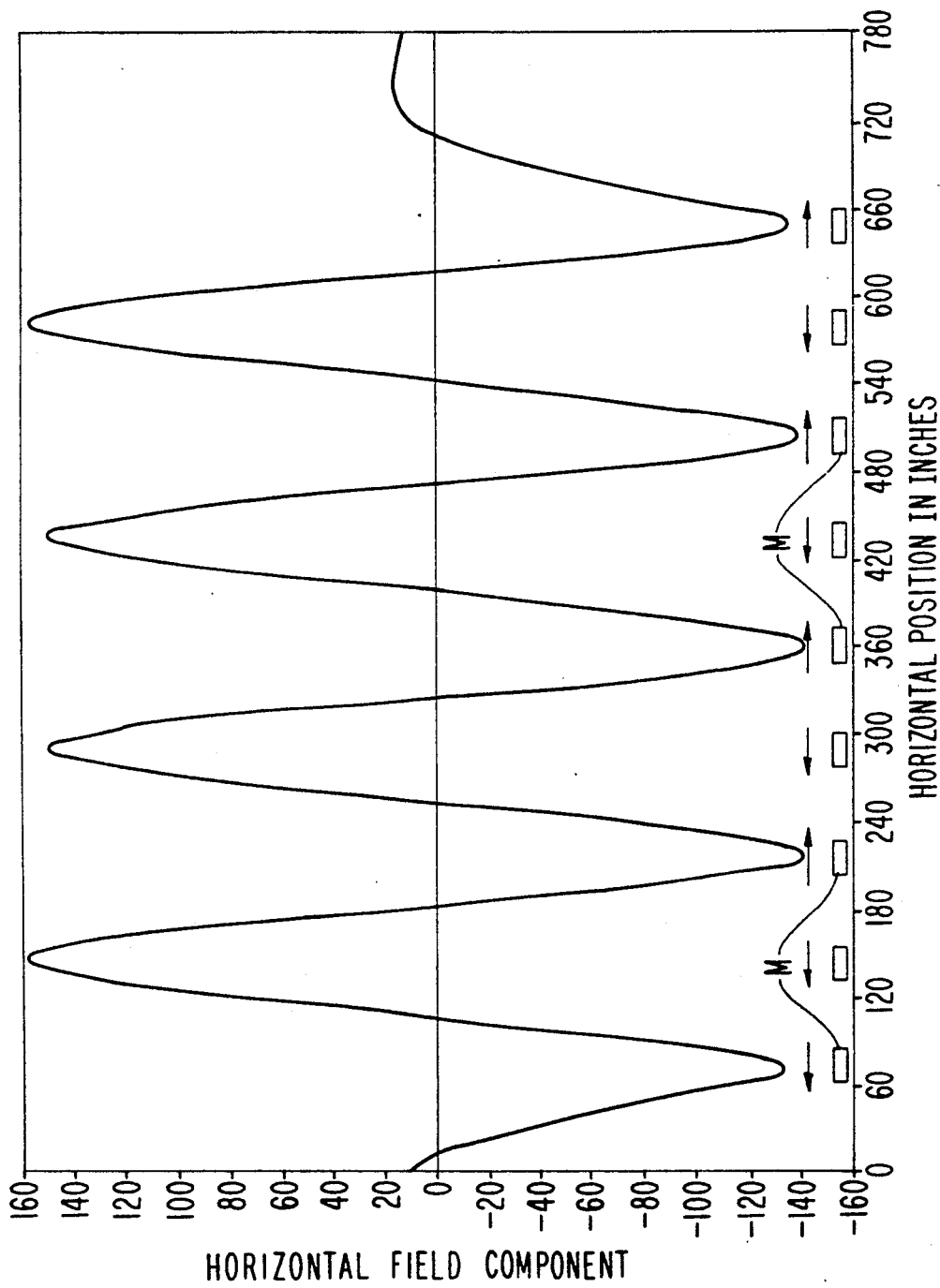
FIGS. 18-22 are diagrams similar to FIGS. 13-17, but in which the horizontal field component is shown.
Figure 19:
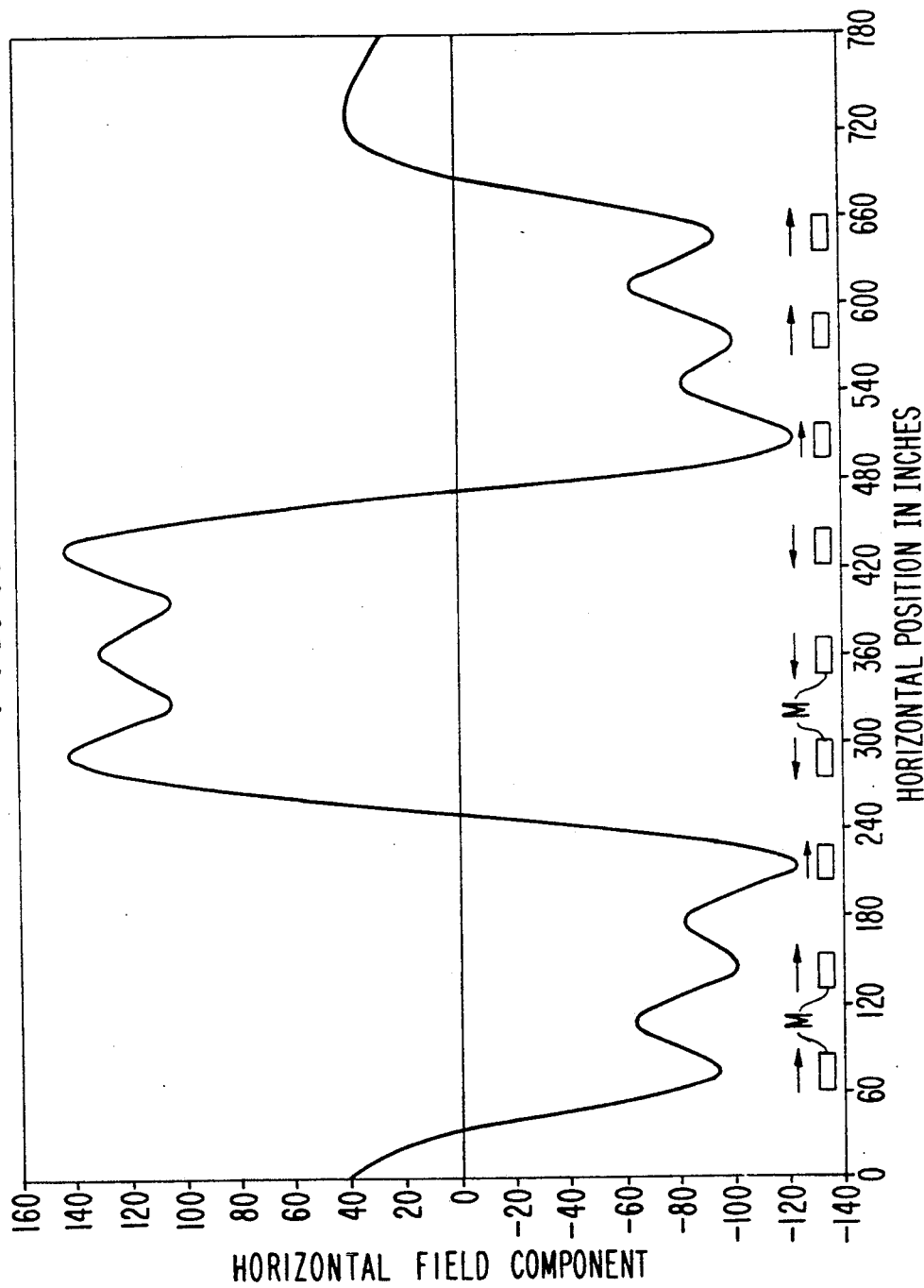
Figure 20:
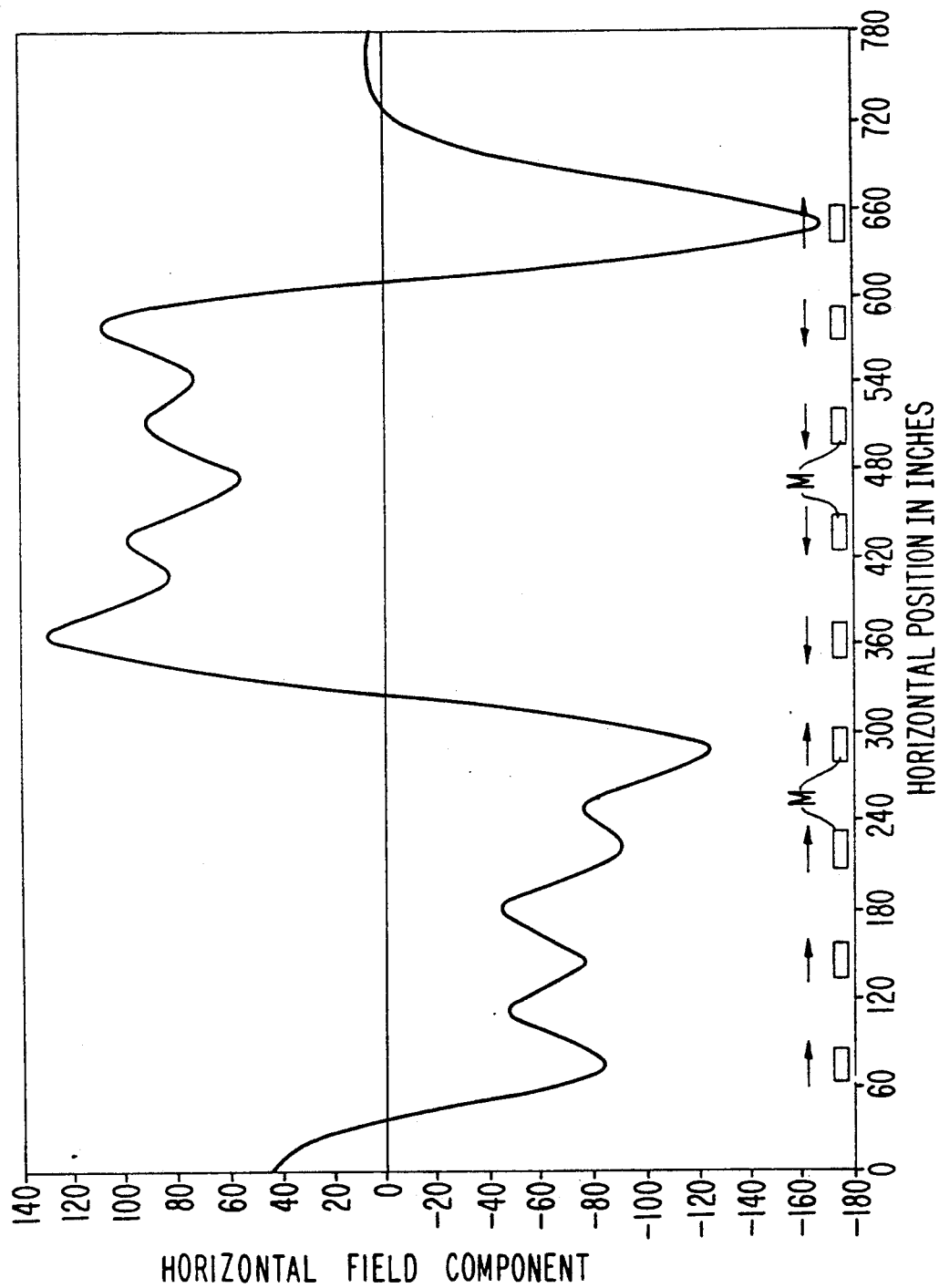
Figure 21:
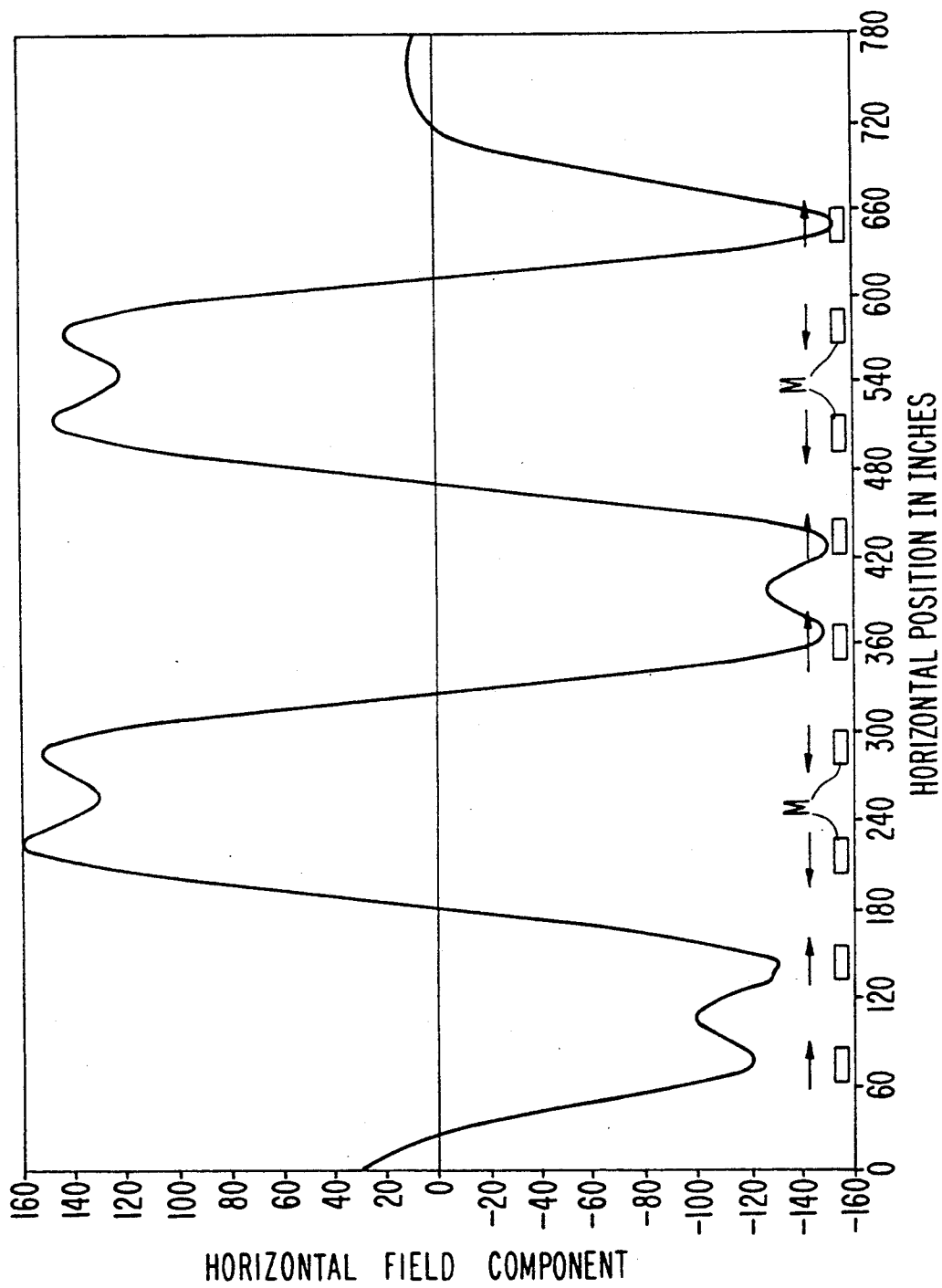
Figure 22:
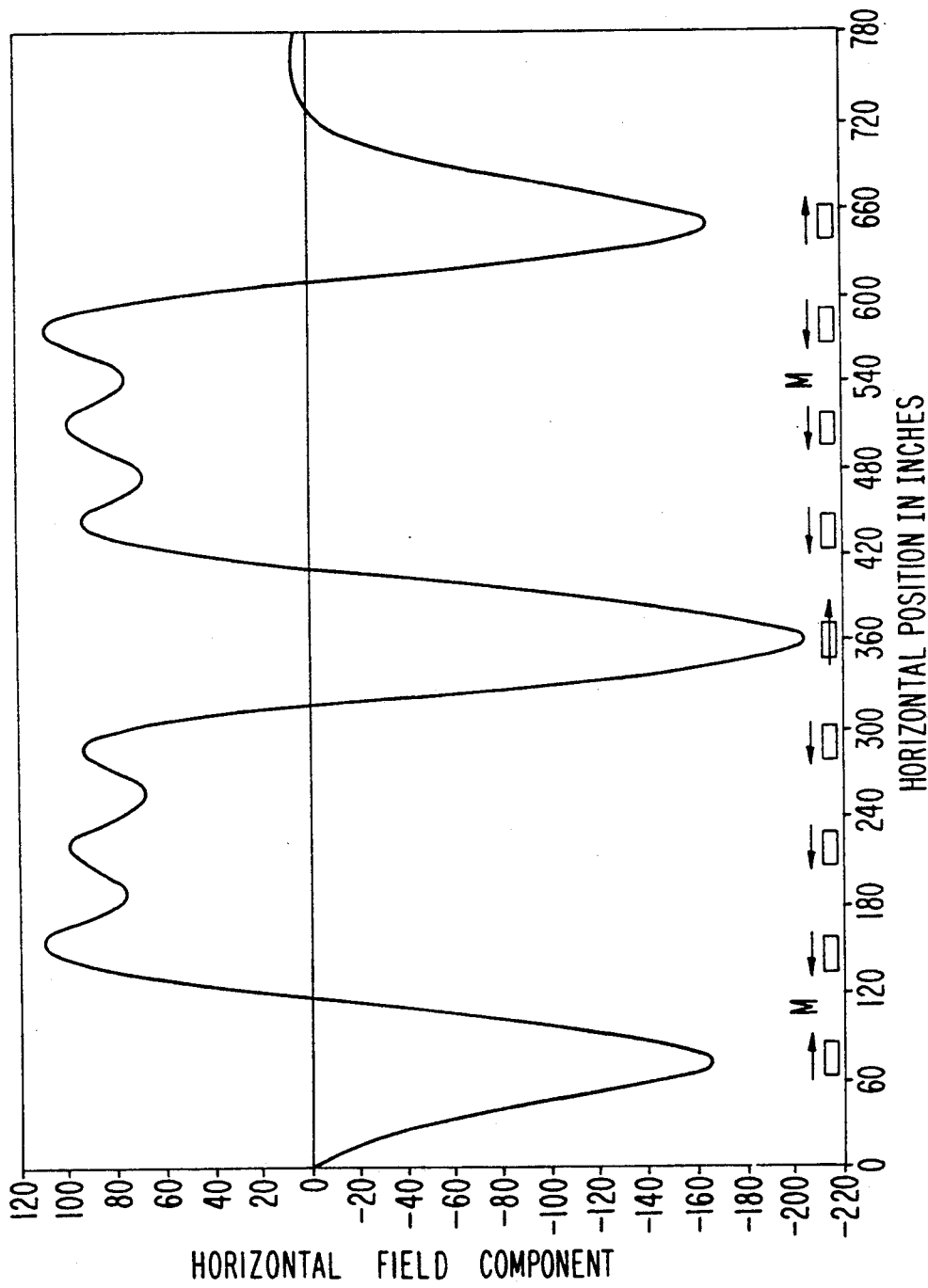

FIG. 10 illustrates the magnetic field of a bar magnet A in a vertical plane containing the magnetic (longitudinal) axis of the bar magnet. FIG. 11 illustrates the vertical component of the magnetic field along a line 1 shown in FIG. 10 at a distance d from the magnet A. FIG. 12 illustrates the resultant vertical magnetic field component along line 1, of two magnets A and B having their magnetic axes collinear and disposed to provide opposing polarities. The center-to-center spacing of the magnets may be approximately five feet, for example, and the line 1 may be about six feet above the axis of the magnets. Ideally, the magnets should be spaced apart a distance approximately equal to the depth at which an object is to be buried, but spacings of the order of 1 to 2 times the depth will be useful in most applications.

It will be observed from FIG. 12 that the resultant vertical magnetic field component at a point along the line 1 midway between the magnets is substantially greater than the magnetic field component of the individual magnets. In other words, the vertical magnetic field components of the magnets are additive. The amplitude of the valleys (negative excursions) of the resultant vertical magnetic field component beyond the respective magnets is less than the vertical component of the individual magnets at the same locations along the line 1. In other words, the vertical field components are subtractive. The bar magnets are spaced so that their magnetic fields are additive or subtractive to produce a resultant field with peaks and valleys along line 1 substantially parallel to the axes of the magnets. This principle is used to provide unique magnetic field signatures that may be employed to identify a variety of hidden elongated objects.

FIGS. 13-17 are diagrams illustrating different vertical component magnetic field signatures obtained by arrays of spaced bar magnets M in which the magnetic axes are collinear but the polarities of the magnets vary. FIGS. 18-22 are similar diagrams illustrating the horizontal field component. It is apparent from FIGS. 13-22 that a magnetic field detector moved along the line 1 parallel to the magnetic axes of the magnets will produce an output corresponding to the major peaks and valleys of the magnetic field signatures if the detector is constructed and disposed appropriately to detect the vertical or horizontal field component. Therefore, if different arrays of magnets are provided lengthwise on elongated objects to be identified, the magnetic field signatures will provide the desired identification.

Figure 23:
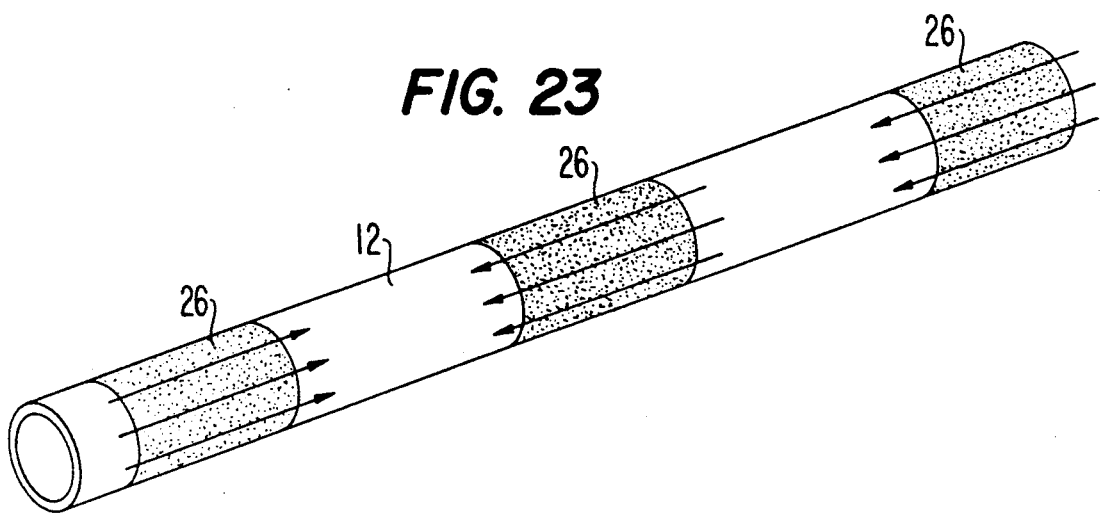
FIGS. 23-25 are fragmentary diagrammatic perspective views illustrating structural variations of the second embodiment.
Figure 24:
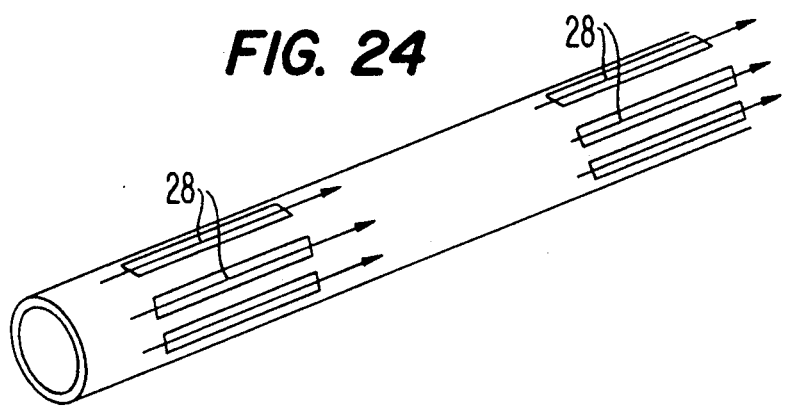
Figure 25:
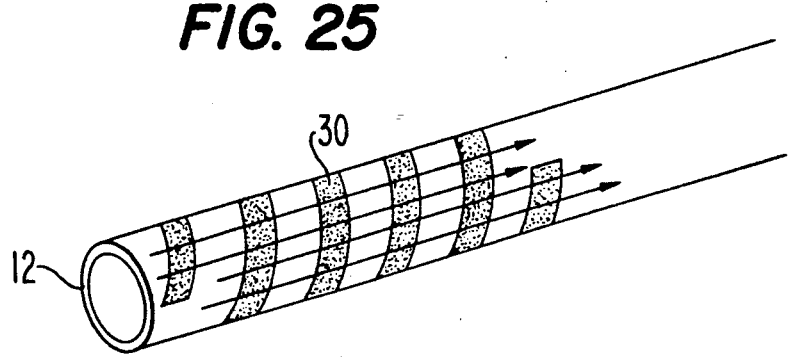

FIGS. 23-25 illustrate typical permanent magnetic identifier devices that may be employed in the second embodiment. As in the first embodiment, magnetic material may be attached to an outer surface of an elongated object, or to an inner surface of a hollow elongated object, or may be integrated into the material of the object itself. In FIG. 23 the magnetic material is in the form of spaced tubes 26 constituting an elongated magnetic identifier device. The tubes are magnetized longitudinally to provide longitudinal magnetic axes. In FIG. 24 the magnetic material is in the form of strips or stripes 28 magnetized longitudinally and defining circumferentially interrupted tubes (like the tubes of FIG. 23 but with gaps in the magnetic material).

In FIG. 25 each "bar magnet" (all of which constitute an elongated magnetic identifier device) is composed of a helical strip 30 similar to the strip of FIG. 8 but magnetized along the length of the object to provide a longitudinal magnetic axis. Only one of the bar magnets is shown in FIG. 25.

In the second embodiment of the invention, addition of magnetic fields of adjacent opposite polarity magnets to produce peaks and/or valleys of substantially greater magnitude than that of individual magnets is especially advantageous. It permits reliable detection of identifier devices of the invention while reducing the amount of magnetic material that is required to produce a detectable magnetic field signature. This aspect of the invention has special utility where the diameter of the hidden object is small and the magnetic material is carried by the object itself, which may be a fiber optic cable, for example. A section of fiber optic "drop" cable extending from a distributor cable to a household may be buried only about a foot deep, for example, and may be detected by virtue of identifier devices of the invention even if the length of the drop cable is quite short.

While preferred embodiments of the invention have been shown and described, it will be apparent to those skilled in the art that changes can be made in these embodiments without departing from the principles and spirit of the invention, the scope of which is defined in the appended claims. For example, although a standard vertical gradiometer may be employed as a magnetic field detector in accordance with the invention, a specialized magnetic field detector may also be employed. Such a detector may be designed to discriminate against signals other than the signal from the magnetic strip. Thus, AC signals may be filtered out. The magnetic field detector may have a readout display in which peaks and valleys of the magnetic field signature produce opposite polarity indications, such as left and right excursions of the needle of a meter from a center neutral position. The detector may be designed to respond to horizontal components of the magnetic field as well as to vertical components. If vector addition is performed on the vertical and horizontal signal components, then a vector sum may be displayed on a 360 compass-type display which rotates as the operator walks along the cable. The detection scheme may give a cable or conduit manufacturer, for example, the option of coding his product with a right hand or left hand helix. The scalar sum of the vertical and horizontal signal components may be indicated by an audio output which exhibits a maximum directly over a buried cable regardless of whether the operator is over a location on the cable where the magnetization is vertical or horizontal. It is evident that visual or audible displays, or a combination of both, may be used in accordance with the invention. Finally, the invention is not limited to use with elongated objects that are buried under the ground; it may be employed to detect elongated objects that are otherwise hidden, such as sub-sea objects.

The invention claimed is:

1. A method of detecting location of an elongated object buried beneath the surface of the earth, comprising burying with said object an elongated permanent magnet device with its length extending along the length of the object and magnetized transverse to its length to provide a magnetic axis that is oriented substantially vertically and to produce a vertical magnetic field component above the surface of the earth and along said object that diminishes at a rate that is substantially less than the cube of the distance from the device in a vertical direction, and detecting said magnetic field component by moving a magnetic detector along the surface of the earth in the vicinity of said object and thereby determining the location of said object.

2. A method in accordance with claim 1, wherein said rate is substantially the square of the distance from said device.

3. A method in accordance with claim 1, wherein said device is incorporated into said object.

4. A method in accordance with claim 3, wherein said object is formed of plastic and said device is constituted by dispersing magnetic material in the plastic and magnetizing the magnetic material transversely to the length of the object.

5. A method in accordance with claim 4, wherein said object is formed as a tube with the magnetic material dispersed in a wall of the tube.

6. A method in accordance with claim 1, wherein said magnetic detector is moved along the surface of the earth substantially in a direction along the length of said object.

7. A method in accordance with claim 1, wherein said magnetic field component is detected by moving a hand-held magnetic detector along the surface of the earth in the vicinity of said object.

8. A method of detecting location of an elongated object buried beneath the surface of the earth, comprising burying with said object an elongated permanent magnet device with its length extending along the length of the object and magnetized transverse to its length to provide a magnetic axis that is oriented substantially transverse to the length of said device and to produce a magnetic field above the surface of the earth that changes repetitively along the length of said device, and detecting the repetitive changes of said magnetic field by moving a magnetic detector along the surface of the earth in the vicinity of said object and thereby determining the location of said object.

9. A method in accordance with claim 8, wherein said device is incorporated into said object.

10. A method in accordance with claim 9, wherein said object is formed of plastic and said device is constituted by dispersing magnetic material in the plastic and magnetizing the magnetic material transversely to the length of the object.

11. A method in accordance with claim 10, wherein said object is formed as a tube with the magnetic material dispersed in a wall of the tube.

12. A method in accordance with claim 8, wherein said magnetic detector is moved along the surface of the earth substantially in a direction along the length of said object.

13. A method in accordance with claim 8, wherein said magnetic field is detected by moving a hand-held magnetic detector along the surface of the earth in the vicinity of said object.

14. A method in accordance with claim 8, wherein the orientation of said magnetic axis changes repetitively along the length of said device.

15. A method in accordance with claim 14, wherein the orientation of said magnetic axis is substantially vertical at regions spaced along the length of said device, and wherein a vertical component of said magnetic field at said regions diminishes at a rate that is substantially less than the cube of the distance from said device in a vertical direction.

16. A method in accordance with claim 15, wherein said rate is substantially the square of the distance from said device.

17. A method in accordance with claim 8, wherein the repetitive changes produce a series of magnetic field peaks and valleys at points along a line parallel to the length of said device that are detected by said detector.

18. A method in accordance with claim 17, wherein said detector is of the type having opposite polarity indications corresponding to said peaks and valleys, respectively.

19. A method in accordance with claim 8, wherein both horizontal and vertical components of said magnetic field vary repetitively along the length of said device, and said detector detects both said horizontal and vertical components.

20. A method in accordance with claim 19, wherein said detector determines a vector sum of said horizontal and vertical components.

21. A method in accordance with claim 19, wherein said detector determines a scalar sum of said horizontal and vertical components.

* * * * *